Patented Oct. 6, 1931

1,825,729

UNITED STATES PATENT OFFICE

WINFRID HENTRICH AND MAX HARDTMANN, OF WIESDORF-ON-THE-RHINE, AND ERNST TIETZE, OF COLOGNE-ON-THE-RHINE, GERMANY, ASSIGNORS TO GENERAL ANILINE WORKS, INC., OF NEW YORK, N. Y., A CORPORATION OF DELAWARE

DIAZONIUM SALTS OF COMPLEX METALLO HYDROFLUORIC ACID

No Drawing. Application filed May 10, 1929, Serial No. 362,126, and in Germany April 3, 1928.

The present invention relates to diazonium salts of complex metallo-hydrofluoric acids and to a process of preparing the same.

In accordance with the invention, diazonium salts of complex metallo-hydrofluoric acids are prepared by causing a complex metallo-hydrofluoric acid (compare Zeitschrift für anorganische Chemie, volume 19, page 158: ibid. vol. 31, page 13; ibid. vol. 61, page 258) and a diazo compound to react upon each other. Acids of the kind specified are, for example: titanis dihydrohexafluoride $(TiF_6)H_2$ (Journ. für praktische Chemie, vol. 81, page 556); aluminum trihydrohexafluoride $(AlF_6)H_3$ (c. f. Gmelins Handbuch der anorganischen Chemie, 8th edition, system number 5, page 61); stannic dihydrohexafluoride $(SnF_6)H_2$ (Gmelin, ibid. page 64); antimonous monohydrotetrafluoride $(SbF_4)H$ (c. f. Pogg, Annalen der Chemie, vol. 87, page 259); antimonic monohydrohexafluoride $(SbF_6)H$ (Zeitschrift für anorganische Chemie, vol. 67, page 314); and zinc dihydrotetrafluoride $(ZnF_4)H_2$ (c. f. Zeitschrift für anorganische Chemie, volume 3, pages 115 and 136).

In carrying out our process we prepare a diazo solution in the customary manner from any aromatic amine, and add thereto an about chemically equivalent quantity of a complex metallo-hydrofluoric acid in aqueous solution; generally we add a small excess of the complex acid. The process is favorably carried out at low temperatures, say at most about 25° C. and in rather concentrated solution.

Likewise double decomposition of the salts of the complex metallo-hydrofluoric acids with diazonium salts of the mineral acids in acid solution yields diazonium salts of the complex metallo-hydrofluoric acids. This process of preparing the new compounds is equivalent to that described above. It is worthy of note that well characterized stable diazonium salts can also be produced from such complex metallo-hydrofluoric acids as in the free state are less stable or unstable.

The diazonium salts of the complex metallo-hydrofluoric acids generally separate in a crystalline form. They can be recrystallized from hot water and dried with heat. They are completely insensitive to rubbing and fairly so to percussion. On heating they decompose without exploding; they are non-inflammable or burn with difficulty. They are readily soluble in water and in aqueous solvents.

The diazonium compounds thus readily obtainable are intended to find application in dyeing and printing and for combating insect pests.

The invention is illustrated by the following examples, without being limited thereto:

Example 1

A bisdiazonium chloride solution of the highest possible concentration and obtained from 28 grams of dianisidine base, 50 grams of crude hydrochloric acid, some ice and 14 grams of sodium nitrite (100%) is treated with 50 cc. of 45% aqueous titanic dihydrohexafluoride.

The separation of the yellowish crystals of bisdiazonium hexafluorotitanate is completed by cooling to 15° C. After filtering and drying in vacuo there is obtained a stable tetrazotization product of dianisidine, which is readily soluble in water. The formation of the new diazonium compound probably takes place according to the following equation:

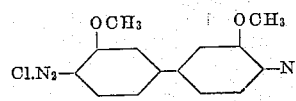 + [TiF$_6$]H$_2$ ⟶ 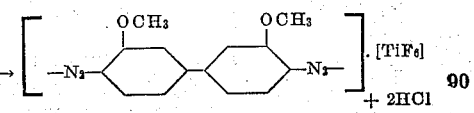

Example 2

On treating the diazonium solution obtained from 19.7 grams of 4-aminoazobenzene, dilute hydrochloric acid and sodium nitrite with 30 cc. of aqueous aluminum trihydrohexafluoride (45%), there separates a beautiful crystalline, stable diazonium compound, readily soluble in water, which, after filtering and drying, can be used as a stabilized diazotization product, for example for the production of dyeings on impregnated fibers. The formation of the new diazonium compound probably proceeds according to the following equation:

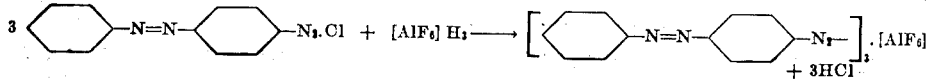

Example 3

22.3 grams of 1-amino-anthraquinone are diazotized with 7 grams of sodium nitrite (100%) in 30 cc. of sulfuric acid monohydrate. When the diazotization is complete, the mass is poured on to ice. The diazonium sulfate precipitated is dissolved in water with cautious heating and filtered into 50 cc. of aqueous stannic dihydrohexafluoride (40%). After strong cooling, the diazonium hexafluorostannate, which crystallizes out, is filtered with suction and dried—advantageously in vacuo. The pale yellow salt is of satisfactory stability. It dissolves readily in water; the aqueous solution is fairly stable. The formation of the new diazonium compound probably proceeds according to the following equation:

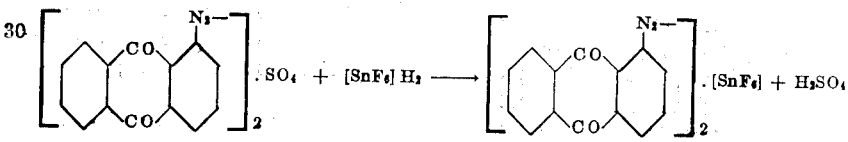

Example 4

13.8 grams of 3-nitraniline are diazotized in the customary manner. The diazonium solution, as concentrated as possible, is filtered and treated with 25 cc. of aqueous antimonous monohydrotetrafluoride (45%). On strong cooling the diazonium tetrafluoroantimonite separates in a well crystallized form. It is filtered with suction and dried in vacuo. The yield amounts to 29 grams. The salt is readily soluble in water. In the dry state it is perfectly stable. The formation of the new diazonium compound probably takes place according to the following equation:

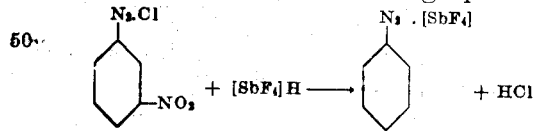

Instead of the diazonium compounds specified in the examples any desired other diazonium compounds, diazoazo compounds and also diazonium compounds from amino polyazo compounds can also be caused to react with the complex metallo-hydrofluoric acids. Similarly, derivatives of polynuclear carboxylic or of mono- and polynuclear heterocyclic and mixed carbo-heterocyclic systems can be caused to react in the form of their diazonium compounds, provided they contain at least one diazotizable amino group.

Instead of using the complex metallo-hydrofluoric acids in question, the same can be produced in the reaction mixture or liberated from their salts.

We claim:

1. The process which comprises causing about chemically equivalent quantities of a complex metallo-hydrofluoric acid and a diazonium compound to react upon each other in aqueous solution.

2. The process which comprises causing about chemically equivalent quantities of a complex titanic hydrofluoric acid and a diazonium compound to react upon each other in aqueous solution.

3. The process which comprises causing about chemically equivalent quantities of titanic dihydrohexafluoric acid and a diazonium compound to react upon each other in aqueous solution.

4. The process which comprises causing about chemically equivalent quantities of titanic dihydrohexafluoric acid and tetrazotized dianisidine to react upon each other in aqueous solution.

5. As a dyestuff intermediates and insecticides, the diazonium salts of complex metallo-hydrofluoric acids, being generally stable, well crystallizing substances, soluble in water.

6. As dyestuff intermediates and insecticides, the diazonium salts of complex titanic hydrofluoric acids, being generally stable, well crystallizing substances, soluble in water.

7. As dyestuff intermediates and insecticides, the diazonium salts of titanic dihydrohexafluoride, being generally stable, well crystallizing substances, soluble in water.

8. As dyestuff intermediate and insecticide, the bisdiazonium salt of titanic dihydrohexafluoride and tetrazotized dianisidine, forming yellowish colored crystals, readily soluble in water.

In testimony whereof we have hereunto set our hands.

WINFRID HENTRICH. [L. S.]
MAX HARDTMANN. [L. S.]
ERNST TIETZE. [L. S.]